(12) United States Patent
Leung

(10) Patent No.: US 9,811,733 B2
(45) Date of Patent: Nov. 7, 2017

(54) METHOD, APPARATUS AND SYSTEM FOR SELECTING A FRAME

(71) Applicant: CANON KABUSHIKI KAISHA, Tokyo (JP)

(72) Inventor: Ka Ming Leung, Marsfield (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/505,364

(22) Filed: Oct. 2, 2014

(65) Prior Publication Data
US 2015/0098645 A1    Apr. 9, 2015

(30) Foreign Application Priority Data

Oct. 4, 2013    (AU) ................................. 2013237718

(51) Int. Cl.
*G06K 9/00* (2006.01)
*G06F 17/30* (2006.01)
*G06T 7/55* (2017.01)

(52) U.S. Cl.
CPC .... *G06K 9/00664* (2013.01); *G06F 17/30811* (2013.01); *G06T 7/55* (2017.01)

(58) Field of Classification Search
CPC ................ G06K 9/4642; G06T 7/0051; G06T 2207/10004; G06T 7/579; H04N 13/0289; H04N 5/23238

USPC ......................................................... 382/154
See application file for complete search history.

(56) References Cited

U.S. PATENT DOCUMENTS

2014/0320593 A1* 10/2014 Pirchheim ............. G06T 7/0071
                                                                           348/36

OTHER PUBLICATIONS

Klein, et al., "Parallel Tracking and Mapping for Small AR Workspaces", In Proc. International Symposium on Mixed and Augmented Reality, IEEE, (2007), pp. 1-10.
Jama, et al., "Parallel Tracking and Mapping for Controlling VTOL Airframe", Journal of Control Science and Engineering, (2011), pp. 1-11, vol. 2011.

* cited by examiner

*Primary Examiner* — Ruiping Li
(74) *Attorney, Agent, or Firm* — Canon U.S.A. Inc., IP Division

(57) ABSTRACT

A method of selecting a frame from a plurality of video frames captured by a camera (120). The method determines features to which map points in a three dimensional space are projected. A histogram of the determined features for a plurality of regions in the frame is created. One of the regions may be determined as being an unmapped region based on the created histogram. The frame is selected based on the size of the unmapped region.

19 Claims, 11 Drawing Sheets

METHOD, APPARATUS AND SYSTEM FOR SELECTING A FRAME

REFERENCE TO RELATED PATENT APPLICATION(S)

This application claims the benefit under 35 U.S.C. §119 of the filing date of Australian Patent Application No. 2013237718, filed 4 Oct. 2013, hereby incorporated by reference in its entirety as if fully set forth herein.

TECHNICAL FIELD

The present invention relates generally to augmented reality (AR) systems and, in particular, to fast and efficient map expansion. The present invention also relates to a method, apparatus and system for selecting a frame from a plurality of video image frames. The present invention also relates to a computer program product including a computer readable medium having recorded thereon a computer program for selecting a frame from a plurality of video image frames.

BACKGROUND

Augmented reality (AR) is a field of computer research which deals with the combination of real world and computer-generated data, where computer graphic objects are blended into real footage in real time. The majority of augmented reality capturing systems operate with predetermined information about the environment of a user. The predetermined information is typically in some form of map. The user is allowed to interact with the environment based on the map. If the map provided is comprehensive, registration can be performed directly and accurately from the map.

Performing registration using a map is a common method used in camera-based augmented reality tracking. One conventional method of creating a comprehensive map is to use fiducial markers densely distributed in user environments during initialization. Unfortunately, creating the map is difficult and time-consuming. Such a map is often created manually by trained technicians.

Methods of tracking hand-held devices, such as a camera, in an unknown environment in real-time are known. Tracking and mapping are typically separated and run in parallel as separate threads on multi-core processors (e.g. a smartphone or desktop computer). The tracking thread deals with the task of robustly tracking erratic hand-held motion in real-time using natural image features. The mapping thread, operating at a lower rate than the tracking thread, produces a three-dimensional (3D) map of point features from a subset of previously observed images called "keyframes". The map may be refined using bundle adjustment.

One disadvantage of the known methods of tracking hand-held devices is that the methods expand the map very slowly. The tracking methods try to expand the map only when a current frame is added as a new keyframe. Typically, to become a keyframe, the current frame needs to satisfy conditions including: tracking quality is good (e.g. ratio between a number of observed map points and a number of potentially visible map points exceeds a predefined threshold); time since the last keyframe was added exceeds some pre-defined threshold, such as two-thirds of a second or twenty (20) frames; and the camera that captured the frame is a minimum distance away from the nearest camera location associated to a keyframe already in the map. The conditions attempt to provide a suitable baseline for triangulating new map points while also avoiding the addition of redundant keyframes by ensuring some distance between the keyframes. However, such conditions can limit the above methods ability to explore the environment. Further, adding new map points becomes difficult once an initial set of keyframes is captured. Adding new map points becomes difficult since the camera location is likely to be close to at least one of the keyframes already in the map, although the current frame may see a significantly different area of the scene due to rotation (i.e. panning). The difficulty of adding new map points prevents fast and reliable exploration of the environment because newly discovered areas remain unmapped.

In the known methods of tracking hand-held devices, after a new keyframe is added, an existing keyframe is selected to pair with the new keyframe to expand the map. New map points are created from the matching point correspondences by triangulation. The known methods use the closest keyframe for the pairing, which limits the possible stereo baseline separation. The closest keyframe does not necessarily have the largest overlap of viewing area.

Requiring a minimum distance between keyframes means that simply rotating the camera will not produce a new keyframe. One method adds a new keyframe based on the camera viewing direction. For each keyframe having an associated camera location less than a minimum distance away from the current camera location, the viewing direction of the current frame is compared with that of the keyframe. If the angle between the viewing directions is larger than a predefined threshold, the current frame is also added as a new keyframe.

To ensure valid triangulation and maximize the number of new map points, one known method firstly determines the closest point of intersection of the camera viewing vectors. The distance between the point of intersection and the camera locations is then compared to scene depths for the keyframes. The difference between expected point depth and actual depth is used as a quality measure. A small difference suggests that the camera is looking at a similar area of the scene, and therefore a keyframe with the lowest difference is used for pairing. An alternative method selects the keyframe that has the highest number of matching correspondences with the current frame.

SUMMARY

It is an object of the present invention to substantially overcome, or at least ameliorate, one or more disadvantages of existing arrangements.

According to one aspect of the present disclosure, there is provided a method of selecting a frame from a plurality of video frames captured by a camera, said method comprising:

determining features to which map points in a three dimensional space are projected;

creating a histogram of the determined features for a plurality of regions in the frame;

determining one of the regions as being an unmapped region based on the created histogram; and selecting the frame based on the size of the unmapped region.

According to another aspect of the present disclosure, there is provided an apparatus for selecting a frame from a plurality of video frames captured by a camera, said apparatus comprising:

means for determining features to which map points in a three dimensional space are projected;

means for creating a histogram of the determined features for a plurality of regions in the frame;

means for determining one of the regions as being an unmapped region based on the created histogram; and means for selecting the frame based on the size of the unmapped region.

According to another aspect of the present disclosure, there is provided a system selecting a frame from a plurality of video frames captured by a camera, said system comprising:

a memory for storing data and a computer program;

a processor coupled to the memory for executing the computer program, the computer program comprising instructions for:

determining features to which map points in a three dimensional space are projected;

creating a histogram of the determined features for a plurality of regions in the frame;

determining one of the regions as being an unmapped region based on the created histogram; and selecting the frame based on the size of the unmapped region.

According to still another aspect of the present disclosure, there is provided a computer readable medium having a computer program stored thereon for selecting a frame from a plurality of video frames captured by a camera, said processor comprising:

code for determining features to which map points in a three dimensional space are projected;

code for creating a histogram of the determined features for a plurality of regions in the frame;

code for determining one of the regions as being an unmapped region based on the created histogram; and code for selecting the frame based on the size of the unmapped region.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
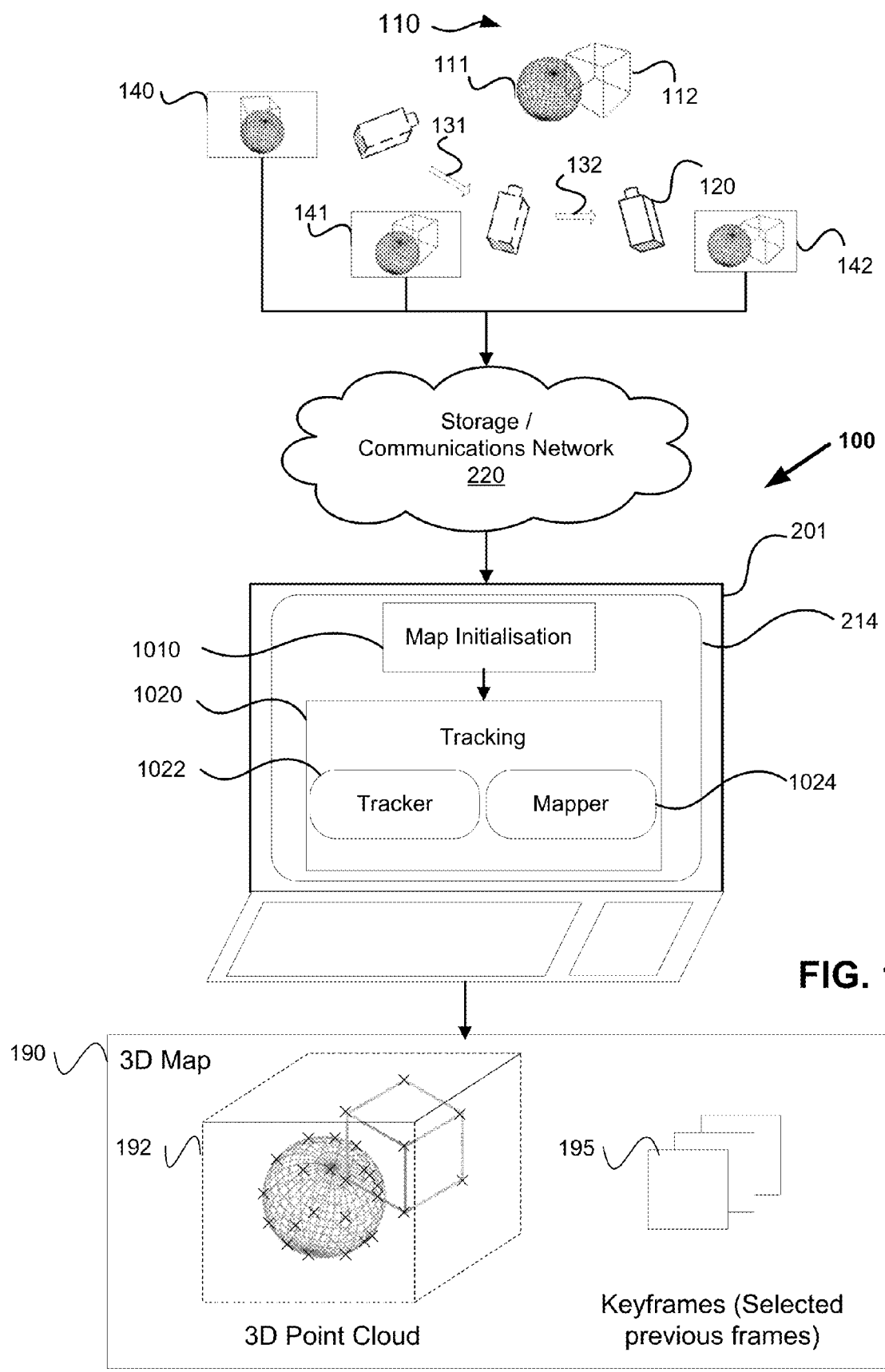
FIG. 1 is a schematic block diagram of a video system upon which arrangements described may be practiced.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a video system 100. The video system 100 comprises a moving camera 120 for capturing images 140, 141 and 142 of, for example, a scene 110. The video system 100 may be referred to as an "augmented reality" video system. As described below, each of the images 140, 141 and 142 may be referred to as a frame.

The moving camera 120 is connected to a communications network 220. The communications network 220 may be a wide-area network (WAN), such as the Internet, a cellular telecommunications network, or a private WAN.

Figure 2A:
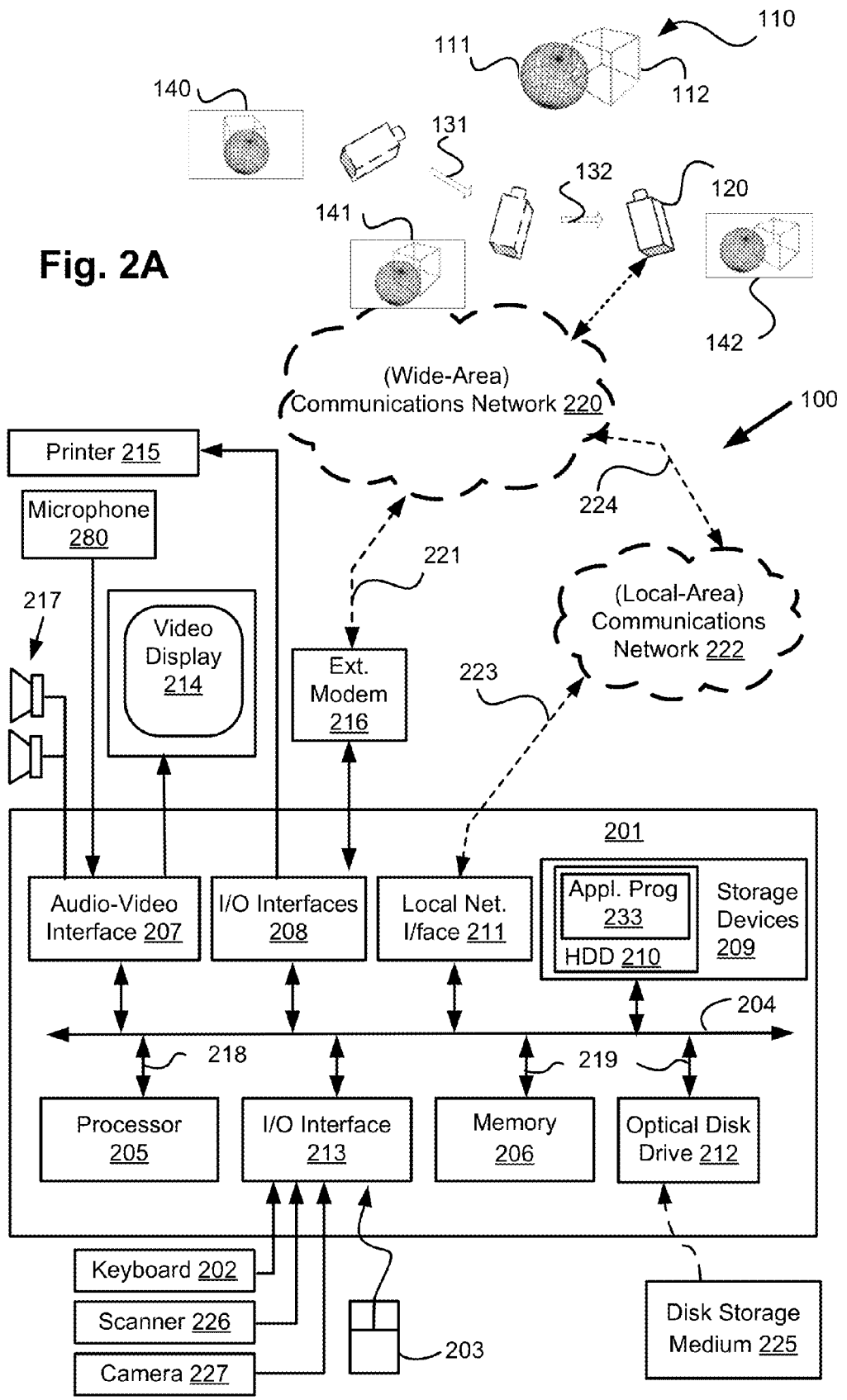
FIGS. 2A and 2B are a schematic block diagram showing a general purpose computer of the video system of FIG. 1.

As seen in FIG. 2A, the video system 100 also includes: a computer module 201; input devices such as a keyboard 202, a mouse pointer device 203, a scanner 226, and a microphone 280; and output devices including a printer 215, a display device 214 and loudspeakers 217. An external Modulator-Demodulator (Modem) transceiver device 216 may be used by the computer module 201 for communicating to and from the communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the system 100 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 205 to 213 of the computer module 201 typically communicate via an interconnected bus 204 and in a manner that results in a conventional mode of operation of the system 100 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

Methods described below may be implemented using the system 100 wherein the processes of FIGS. 1 to 10, to be described, may be implemented as one or more software application programs 233 executable within the system 100. In particular, the steps of the described methods are effected by instructions 231 (see FIG. 2B) in the software 233 that are carried out within the system 100. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 233 is typically stored in the HDD 210 or the memory 206. The software is loaded into the computer system 100 from the computer readable medium, and then executed by the computer system 100. Thus, for example, the software 233 may be stored on an optically readable disk storage medium (e.g., CD-ROM) 225 that is read by the optical disk drive 212. A computer readable medium having such software or computer program recorded on the computer readable medium is a computer program product. The use of the computer program product in the computer system 100 preferably effects an advantageous apparatus for implementing the described methods.

In some instances, the application programs 233 may be supplied to the user encoded on one or more CD-ROMs 225 and read via the corresponding drive 212, or alternatively may be read by the user from the networks 220 or 222. Still further, the software can also be loaded into the system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
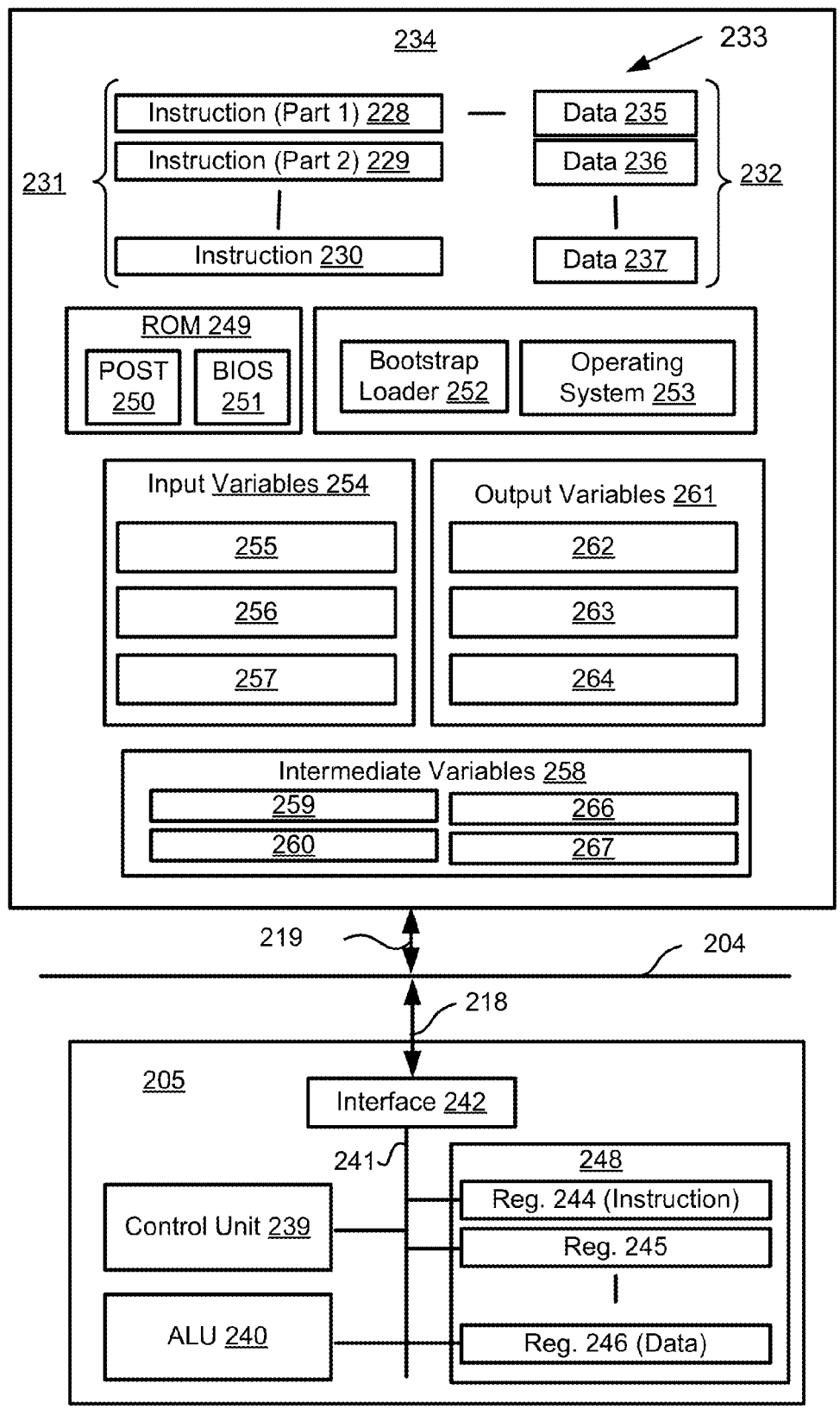
Figure 3:
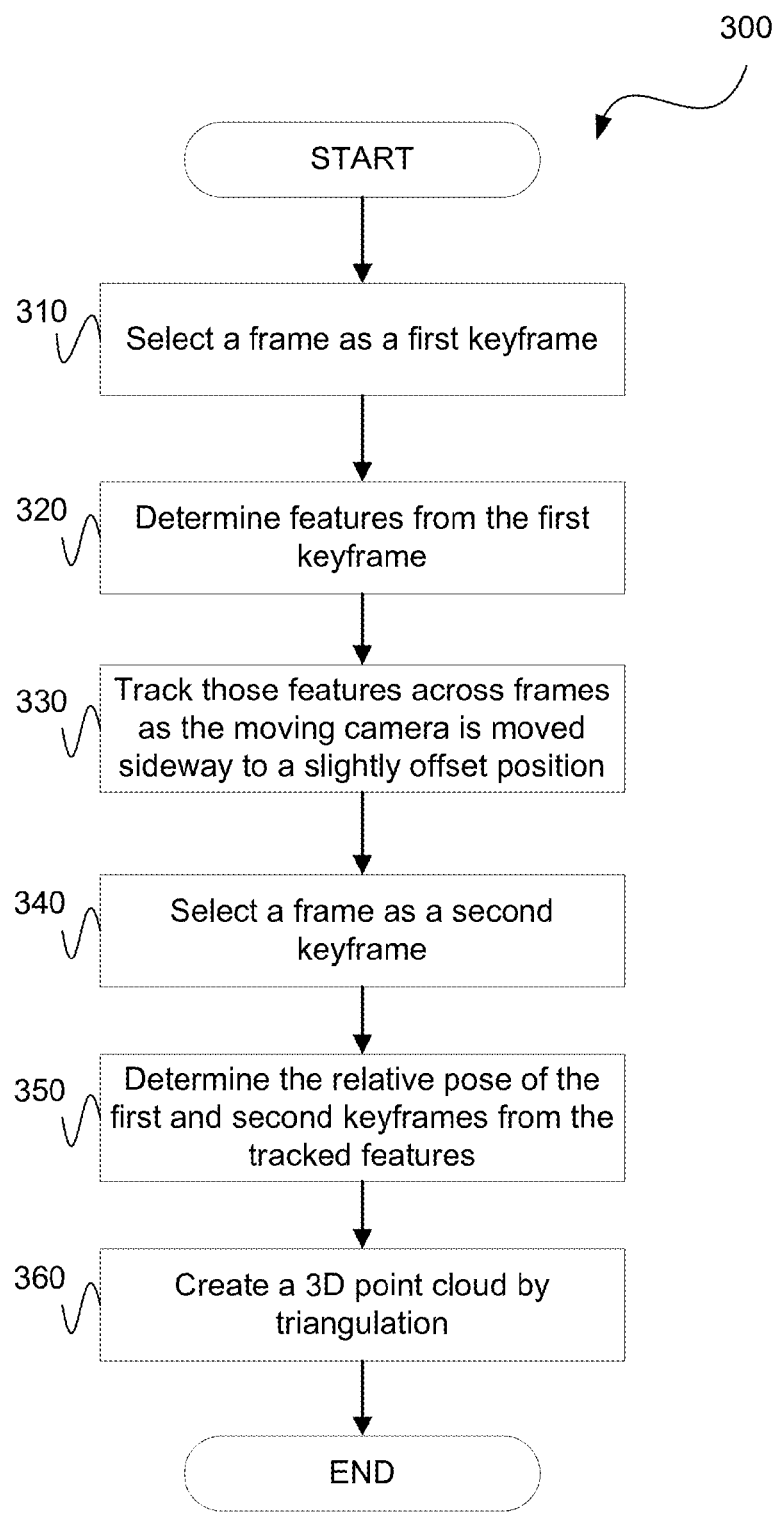
FIG. 3 is a schematic flow diagram showing a method of creating a three dimensional (3D) map.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 100 of FIG. 2A must be used properly so that each process can run effectively. Accordingly, the aggregated memory 234 is not intended to illustrate how particular segments of memory are allocated (unless otherwise stated), but rather to provide a general view of the memory accessible by the system 100 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically include a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The described methods use input variables 254, which are stored in the memory 234 in corresponding memory locations 255, 256, 257. The described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 1 to 10 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The described methods may alternatively be implemented in dedicated hardware such as one or more integrated circuits performing the functions or sub functions of the described methods. Such dedicated hardware may include field-programmable gate arrays (FPGA), application-specific integrated circuits (ASIC), graphic processors, digital signal processors, or one or more microprocessors and associated memories. The dedicated hardware may also include devices embedded within the camera 120 which would otherwise have comparable functions to the arrangements performed solely in software executed within the computer module 201.

In one arrangement, the described methods may be implemented as software being executed by a processor of the camera 120, or may be implemented using dedicated hardware within the camera 120. In an alternative arrangement, the described methods may be implemented using a hybrid arrangement of software and hardware modules.

In the example of FIG. 1A, the scene 110 comprises a three dimensional (3D) spherical object 111 and a 3D square object 112 and is largely static. The frames 140, 141, and 142 represent a view of the 3D scene 110 from different viewpoints.

In one arrangement, the moving camera 120 is a digital still-image camera capturing the frames (or images) 140, 141 and 142 representing the scene 110. In an alternative arrangement, the moving camera 120 is a digital video camera capturing the frames (or images) representing the scene 110 in the three dimensional (3D) space continuously at a pre-determined frame rate. In a further arrangement, the camera 120 is a multi-lens camera system such as a stereo camera. In a still further arrangement, a multi-view camera system comprising two or more separate cameras may be used to capture the frames 140, 141 and 142 representing the scene 110.

The moving camera 120 may be calibrated using any suitable camera calibration algorithm for determining camera intrinsic parameters. The camera intrinsic parameters, such as focal length, principal points and lens distortion parameters, may be pre-determined for the moving camera 120. The moving camera 120 is at an initial location, denoted by the camera 120 in dotted lines, with respect to the scene 110. As seen in FIG. 1, frame (or image) 140 represents a view of the scene 110 as captured by the camera 120 when the camera 120 is at an initial location. The moving camera 120 may then be moved, as represented by arrow 131, to a second location where the moving camera 120 captures frame (or image) 141 representing a different view of the scene 110. The moving camera 120 may then be moved further from the second location, as represented by arrow 132, to a third location as denoted by the camera 120 in solid lines, where the second and the third locations are different from the initial location.

For the purposes of explanation, in FIG. 1 the moving camera 120 shown in solid lines represents the same moving camera 120 shown in dotted lines after the moving camera 120 is moved from the initial location to a new location. As seen in FIG. 1, captured frame (or image) 142 represents a view of the scene 110 as captured by the camera 120 at the new location.

The frames (or images) 140, 141 and 142 may be downloaded sequentially, using the processor 205 of FIG. 2A, from the moving camera 120 to the computer module 201, via the communications network 220. Alternatively, upon being captured, the frames 140, 141 and 142 may be sent to the computer module 201 by the camera 120.

The system 100 may be configured for performing vision-based camera tracking and localisation using computer vision algorithms implemented by one or more code modules of the software application programs 233 resident on the hard disk drive 210 and being controlled in its execution by the processor 205. In one arrangement, one or more of the code modules of the software application program 233 may be configured to form a map initialisation software module 1010 for creating an initial 3D map 190 at system start-up. The 3D map 190 may be stored in the memory 206 and/or 209. Further, one or more of the code modules of the software application program 233 may be configured to form a tracking software module 1020 for performing efficient camera tracking. The tracking software module 1020 may further comprise a tracker software module 1022 for determining pose (i.e., position and orientation) of the camera 120 from an input image. The tracking software module 1020 may further comprise a mapper software module 1024 for constructing and expanding the 3D map 190 incrementally over time.

As seen in FIG. 1, the 3D map 190 comprises a 3D point cloud 192 represented by a set of 3D map points and a subset of previous frames called keyframes 195. The keyframes 195 is used by the mapper software module 1024 to expand the map 190. In the example of FIG. 1, the tracker software module 1022 and the mapper software module 1024 are running in parallel on different threads in the computer module 201. The tracker software module 1022 operates at a different frame rate from that of the mapper software module 1024. In an alternative arrangement, the operations of the tracker software module 1022 and the mapper software module 1024 are interleaved.

In the arrangement of FIGS. 1 to 2B, the computer module 201 is a desktop general purpose computer. Alternatively, the computer module 201 may be a server computer or the like. The methods to be described may also be performed on a low-power, portable computing device, such as a smartphone, a mobile phone, a portable media player, a digital camera or the like, in which processing resources are limited.

When the system 100 is first started, an initial 3D map 190, represented by a 3D point cloud 192 and initial keyframes 195, is created by the map initialisation software module 1010. The 3D map 190 is subsequently used by the tracking software module 1020 to determine the position and orientation of the camera 120 from an input frame (or image) captured by the moving camera 120. A method 300 of creating a 3D map will be described in detail below with reference to FIG. 3. The method 300 may be executed by one or more of the software code modules forming the map initialisation module 1010, which are resident in the hard disk drive 210 and being controlled in their execution by the processor 205.

The method 300 begins at selecting step 310, where a frame captured by the moving camera 120 is selected as a first keyframe by the map initialisation module 1010, under execution of the processor 205. The first keyframe may be selected from a plurality of frames captured by the camera 120. In one arrangement, a user may place the moving camera 120 at an initial position in the scene 110 and select a frame captured by the moving camera 120 as the first keyframe from which a three-dimensional (3D) map of point features is produced. The first keyframe may be stored in the 3D map 190 configured in the memory 206 or in the storage device 209 of FIG. 2A.

After the first keyframe is selected, the method 300 proceeds from selecting step 310 to determining step 320. At step 320, the processor 205 is used for determining a set of image features in the first keyframe. The determined image features may include, for example, points, lines, corners or curves in the first keyframe. In one arrangement, locations of image features are detected at step 320 using the FAST ("Features from Accelerated Segment Test") algorithm.

For each pixel location in the selected keyframe (or image), the FAST algorithm may be used to determine whether the pixel location is a corner by evaluating the intensity of the pixel against a circle of sixteen (16) surrounding pixels. If there is a run of n or more consecutive pixels consistently having intensity values larger or smaller than the centre pixel, then the pixel is considered to be a corner. In one arrangement, n is set to ten (10) as a trade-off between processing time and tracking accuracy. Non-maximal suppression and thresholding based on a "Shi-Tomasi" score may be used to detect the most salient image features of the selected keyframe.

Alternatively, other image feature detection algorithms such as the Harris Corner Detection algorithm, the Scale-Invariant Feature Transform (SIFT), the Speeded Up Robust Features (SURF) algorithm, and the Binary Robust Invariant Scalable Keypoints (BRISK) may be used at step 320 for detecting image features. A set of image features detected in the first keyframe at step 320 may be stored in memory 206.

In the example of FIG. 1, the camera 120 is moved sideways from the initial position of the camera 120, where the camera 120 captured the frame selected as the first keyframe, to a second position. The second position may be slightly offset from the initial position of the camera 120. In one arrangement, the camera 120 may be moved a minimum distance from the initial location of the camera 120 when the first keyframe was captured. The minimum distance may depend on the average distance between the objects in the scene 110 and the moving camera 120. In one arrangement, the minimum distance may be set to one-tenth of the scene depth.

Following step 320, at tracking step 330, all subsequent frames captured by the camera 120 after the camera 120 is moved to the new position are searched for the image features determined for the first keyframe. In one arrangement, a 2D patch of size 8-by-8 pixels centred at an image feature location is created for each determined image feature in the first keyframe. Such a 2D patch search may be performed to determine matching image features in the subsequently captured frames. For each detected image feature in the first keyframe, any image feature in a new frame within a circular region with a small radius (e.g., twenty (20) pixels) are considered to be potential image feature correspondences. A 2D 8×8 patch match may then be performed to determine a patch which best matches the 2D patch centred at the image feature location based on a zero-mean sum of squared differences (ZSSD) score. Such a patch matching process may be repeated until a second keyframe is selected.

In an alternative arrangement, an image feature descriptor may be created for each image feature detected in the first keyframe. Feature matching may then be performed by detecting image features in the new frame, for which the difference between the image feature descriptors is the smallest. In one arrangement, image feature descriptors may be generated based on gradient distribution near the location of detected image features using algorithms such as SIFT and SURF. Alternatively, image feature descriptors may be generated by concatenating results of a set of intensity and gradient comparison tests between pairs of sample points near the location of detected image features using algorithms such as BRISK, the Fast Retina Keypoint (FREAK) and the Local Difference Binary (LDB) algorithm.

The method 300 proceeds from step 330 to selecting step 340, where a second keyframe is selected from the frames captured by the camera 120 positioned at the new position. In one arrangement, the user selects a frame as a second keyframe after the camera 120 is moved by the minimum distance away from the location of the camera 120 when the camera 120 captured the first keyframe. In one arrangement, the second keyframe is selected by the user based on the patch matching process. The map initialisation module 1010 may be configured to store the second keyframe in the map 190 configured within the memory 206 or storage module 209.

Also at step 340, the processor 205 is used to determine a set of image feature correspondences between the first and the second keyframes, based on the search for the image features determined for the first keyframe at step 330.

After the set of image feature correspondences between the first and second keyframes are determined, the method 300 proceeds to step 350, where relative pose of the camera 120 when capturing the first and the second keyframes, respectively, is determined under execution of the processor 105.

In one arrangement, a five-point algorithm is used at step 350 to determine the relative pose of the camera 120 for the first and second keyframes. The five-point algorithm may be used to randomly select five image feature correspondences across the first and the second keyframes to determine an estimate of an essential matrix. Each time an estimate of the essential matrix is generated, an objective function, such as the Sampson distance measure (SD), is used to evaluate the quality of the estimation (i.e. residual errors) using at least a thousand or more image feature correspondences. The five-point algorithm may be repeatedly executed a large number of times for different random sets of image feature correspondences. The essential matrix that gives a lowest score (i.e. min SD) may be selected as a best estimate for the relative pose of the camera 120 for the first and second keyframes.

Alternatively, other algorithms such as an eight-point algorithm, a seven-point algorithm, and a six-point algorithm may be used to determine the relative pose of the camera 120 at step 350.

After the relative pose (i.e., position and orientation) of the camera 120 is determined for the first and second keyframes at step 350, the method 300 proceeds to a map creating step 360. For each pair of image feature correspondences determined at step 340, the 3D coordinates of an associated map point is determined at step 360 from the relative pose between the first and second keyframes and the image locations of the image feature correspondences, using triangulation. In one arrangement, a non-linear triangulation method using the Sampson approximation may be used to determine the 3D coordinates of the map points at step 360. Alternatively, linear triangulation methods based on a Direct Linear Transformation algorithm may be used at step 360 for determining the 3D coordinates of the map points. As described above, the first and second keyframes determined at steps 310 and 340 respectively are stored in the 3D map 190 configured within the memory 206 or the storage module 209.

The map points determined at step 360 form the 3D point cloud 192 in the coordinate system of the first keyframe (referred as the world coordinate system). The 3D point cloud 192 and the first and second keyframes collectively form the initial 3D map 190.

In an alternative arrangement, the 3D point cloud 192 is a partial reconstruction of the scene 110 and is generated offline using fiducial markers. In such a fiducial marker arrangement, the fiducial markers may define the scale and the global coordinates of the map 190.

In a further arrangement, the 3D point cloud 192 may be constructed offline, for example, by performing structure-from-motion or 3D reconstruction techniques on a subset of frames.

In yet one further arrangement, the map initialisation module 1010, under execution of the processor 205, may use an automatic map initialisation method to select the first and second keyframes. For example, a Geometric Robust Information Criterion (GRIC) algorithm may be applied to the first keyframe and a subsequent frame to determine whether a homography or epipolar geometry model fits better to a set of corresponding image features determined for the first keyframe and the subsequent frame. The model with the lowest score is a best fit. The homography model assumes the first and second keyframes to be images of the same planar surface and fits better to a set of corresponding image features when the displacement of the moving camera 120 is small. As the displacement of the moving camera 120 from its initial position increases, both the homography or epipolar geometry models become equivalent and eventually the epipolar geometry model outperforms the homography based model. In one arrangement, when a GRIC score determined based on the epipolar geometry model drops below a GRIC score determined based on the homography model, the first frame, occurring after the first keyframe, for which the number of tracked image features is above 90% of the number of image features tracked is selected as a second keyframe.

Figure 4:
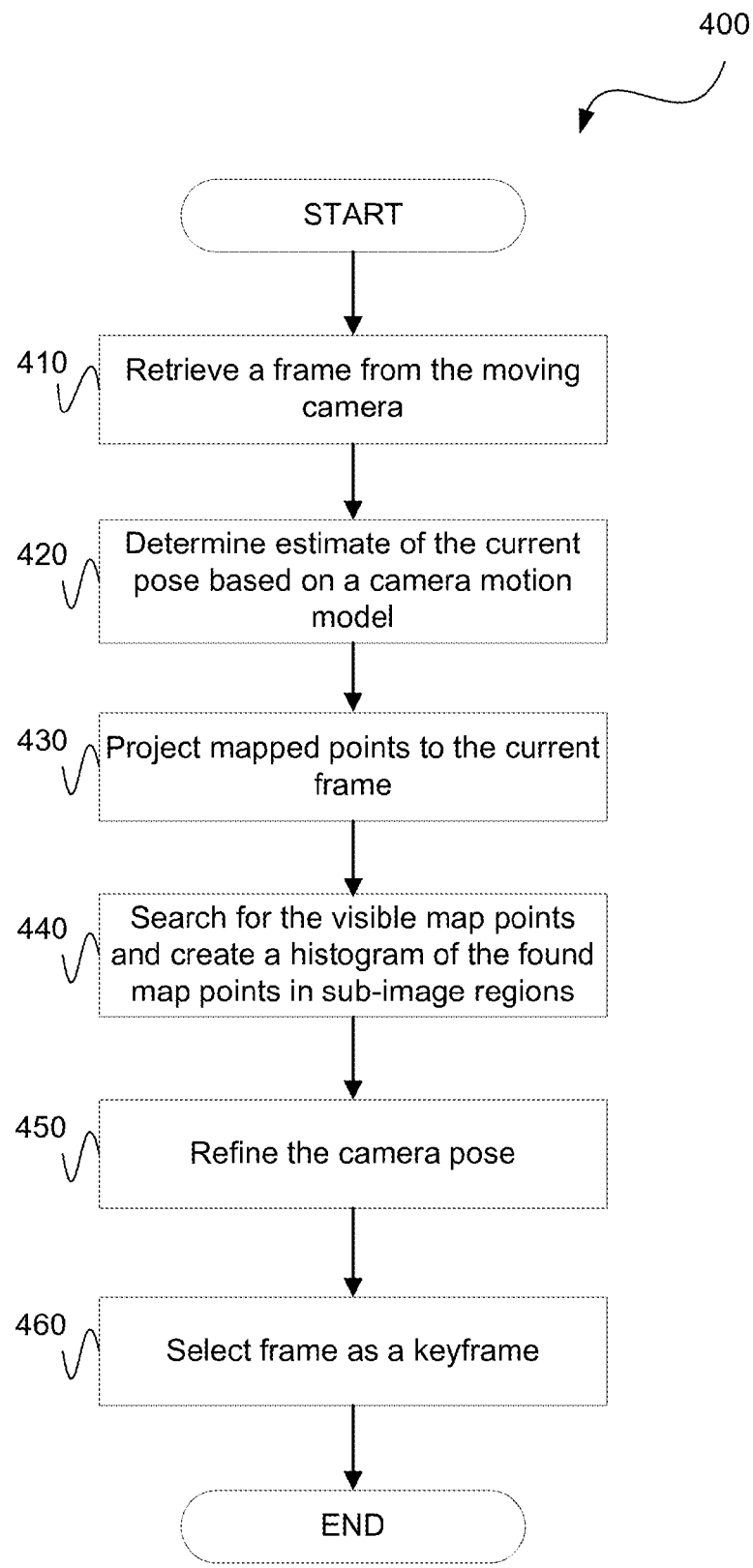
FIG. 4 is a schematic flow diagram showing a method of determining pose of a moving camera.
Figure 5:
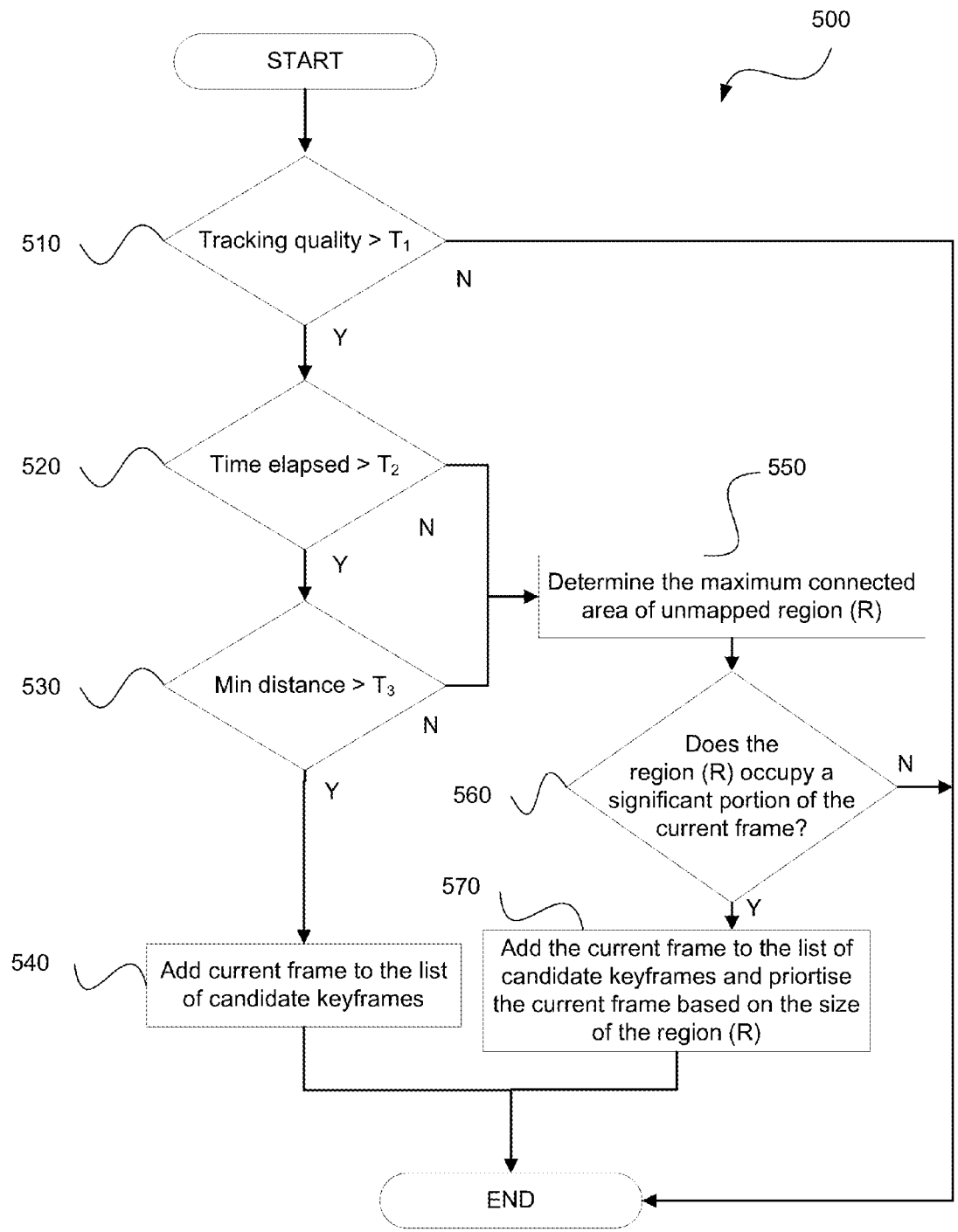
FIG. 5 is a schematic flow diagram showing a method of selecting a keyframe.

The tracker software module 1022 in FIG. 1 will now be described in further detail with reference to FIG. 4. The tracker software module 1022 provides an initial estimate of the current pose of the moving camera 120 based on a camera motion model. The tracker software module 1022 subsequently refines the initial estimate of the current pose based on observed map points in the 3D point cloud 192.

A method 400 of determining pose of the moving camera 120 as executed by the tracker software module 1022, will now be described in detail with reference to FIG. 4. The method 400 may be executed by one or more of the software code modules forming the tracker software module 1022, which are resident in the hard disk drive 210 and are controlled in their execution by the processor 205. The method 400 will be described by way of example with reference to the moving camera 120.

The method 400 begins at retrieving step 410, where a frame captured by the moving camera 120 is retrieved. The frame may be retrieved from the memory 206 or the storage module 209, for example. Also at step 410, image features are extracted from the retrieved frame by the tracker module 1022 under execution of the processor 205. In one arrangement, locations of image features are detected in the retrieved frame using the FAST algorithm.

The method 400 continues from retrieving step 410 to estimating step 420, where the current camera pose of the moving camera 120 is estimated from a camera motion model. In one arrangement, a decaying-velocity model is used at step 410 to estimate the pose of the moving camera 120. The motion model may be similar to a simple alpha-beta constant velocity model and have a decay term for improved stability. If tracking fails to obtain any new measurements of the poses of the camera 120, the camera poses estimated at step 420 will gradually slow down and eventually stop.

In an alternative arrangement, a linear velocity model is used at step 420 to estimate the pose of the moving camera 120. In yet another arrangement, the camera 120 is assumed to be stationary.

The method 400 proceeds from step 420 to projecting step 430, where the tracker module 1022, under execution of the processor 105, projects map points 192 into the frame retrieved at step 410 (i.e., "the current frame") based on the estimated camera pose generated at step 420. As an example, the map points 192 determined at step 360 may be projected into the retrieved frame. The map points 192 determined at step 360 are firstly transformed from the world coordinate system (i.e. the coordinate system of the first key frame) to a local camera coordinate frame in accordance with Equation (1), as follows:

$$\begin{bmatrix} X_c \\ Y_c \\ Z_c \\ 1 \end{bmatrix} = [R \mid t] \begin{bmatrix} X_w \\ Y_w \\ Z_w \\ 1 \end{bmatrix} \quad (1)$$

where $(X_w, Y_w, Z_w)$ represent the coordinates of a map point in the world coordinate system, $(X_c, Y_c, Z_c)$ represent the coordinates of the map point at the viewpoint of the estimated pose of the camera 120.

Then, the image coordinates of the map point in the current frame are determined in accordance with Equation (2), as follows:

$$\begin{bmatrix} x \\ y \\ 1 \end{bmatrix} = K \begin{bmatrix} X_c \\ Y_c \\ Z_c \end{bmatrix} \quad (2)$$

where (x, y) are the predicted image coordinates of the map point, and K is a 3×3 matrix as follows:

$$K = \begin{bmatrix} f_x & \gamma & c_x \\ 0 & f_y & c_y \\ 0 & 0 & 1 \end{bmatrix}$$

where $f_x$, $f_y$ represent the focal length in horizontal and vertical directions; $c_x$ and $c_y$ represent a principal point, and $\gamma$ represents a skew coefficient between the x and the y axis. $f_x$, $f_y$, $c_x$, $c_y$, and $\gamma$ may be computed by any suitable camera calibration algorithms.

A map point is determined to be visible in the current frame if the predicted location of the map point is within predetermined thresholds of the size of the current frame.

After step 430, the method 400 proceeds to searching step 440, where the tracker module 1022, under execution of the processor 205, is used for determining image features to which the map points 192 in the three dimensional space are projected. As described above, the determined image features may include, for example, points, lines, corners or curves. In determining the image features, the tracker module 1022 searches for the visible ones of the determined map points in the current frame around predicted locations for the map points determined at step 430.

For each visible map point, at step 440, an m-by-m patch centred at the location of a first observation of the map point in the image is generated at step 440. In one arrangement, m is set to eight (8). The m-by-m patch is then warped to take account of viewpoint changes between the first observation and the current position of the camera 120. The mean pixel intensity is subtracted from individual pixel values to provide some resilience to lighting changes. A patch search is then performed on the current frame under execution of the processor 205 to determine a best matching patch in the current frame. The patch search may performed by evaluating sum of square difference (ZSSD) scores at the location of all image features (e.g., FAST corners) within a search region and selecting the location (i.e., with the current frame) with a smallest difference score. A map point may be considered to be found if the ZSSD score is smaller than a predefined threshold.

The current frame is divided into sub-image regions. A histogram of the image features corresponding to the found map points is created for a plurality of sub-image regions in the current frame. The histogram is created to determine the number of the determined image features corresponding to the found map points in each sub-image region of the current frame. One or more sub-image regions may be determined as being part of an unmapped region based on the created histogram.

A sub-image region may be determined as being part of an unmapped region if a number of image features corresponding to the found map points the sub-image region contains is less than a predetermined threshold. The total number of found map points in the current frame is the sum of the histogram over all sub-image regions.

In one arrangement, the current frame is divided into a grid of M-by-N cells. Each of the cells within the grid may be referred to as a sub-image region. An unmapped region is a rectangular region of cells containing less than a predefined number of image features corresponding to the found map points. Adjacent unmapped regions may be combined to form a larger unmapped region.

In an alternative arrangement, sub-image regions may have irregular shapes and sizes (e.g. super-pixels). An unmapped region may be formed by concatenating adjacent super-pixels with the density of image features corresponding to the found map points less than a predefined (or "predetermined") threshold.

Following the searching step 440, the method 400 proceeds to refining step 450 where the tracker module 1022, under execution of the processor 105, refines the current pose (i.e., position and orientation) of the camera 120 estimated at step 420 using the found map points. The estimated pose may be refined iteratively using a minimisation algorithm to reduce the difference between actual image feature locations of the found map points and predicted locations of the found map points based on the current estimated pose of the camera 120. In one arrangement, the minimisation algorithm used at step 450 is an iterative least-squares algorithm such as the Levenberg-Marquardt (LM) algorithm. Alternatively, Gauss-Newton methods or gradient-decent may also be used to refine the estimated pose of the camera 120 determined at step 420. The refined estimation of the current pose determined at step 450 provides an accurate and reliable determination of the current pose of the camera 120.

The method 400 then proceeds from step 450 to determining step 460. At step 460, the tracker module 1022, under execution of the processor 105, selects the current frame as a keyframe based on the maximum connected area of an unmapped region. A method 500 of selecting a frame as a keyframe, as executed at step 460, will be described in detail below with reference to FIG. 5. In accordance with the method 500, the tracker module 1022 determines if the current frame should be added as a candidate keyframe to the 3D map 190. The current frame is inserted into a candidate keyframe list configured within memory 206 based on the maximum connected area of an unmapped region.

The method 500 may be executed by one or more of the software code modules forming the tracker software module 1022, which are resident in the hard disk drive 210 and are controlled in their execution by the processor 205. The method 500 determines whether the current frame should be selected as a candidate keyframe. The current frame is selected as a candidate keyframe based on the size of an unmapped region. The method 500 adds the current frame to a candidate keyframe list and prioritises the current frame among all candidate keyframes in the list based on the size of the maximum connected area of the unmapped region. The current frame may be used by the mapper module 1024 to expand the 3D map 190.

The method 500 begins at decision step 510, where the tracker software module 1022, under execution of the processor 205, determines whether the tracking quality is larger than a predefined threshold $T_1$. If the tracking quality exceeds the threshold $T_1$, the method 500 proceeds to step 520. Otherwise the method 500 terminates and the current image is discarded.

In one arrangement, tracking quality is defined as a ratio between the number of found map points and the number of visible map points. The number of found map points is the sum of the histogram for all cells determined at step 440 of the method 400. In one arrangement, the threshold $T_1$ is set to 0.3. In an alternative arrangement, tracking quality may be defined as the minimum number of found map points in the current image.

At decision step 520, the tracker software module 1022, under execution of the processor 205 determines whether the time since the last keyframe was added to the 3D map 190 has exceeded a predefined threshold $T_2$. If the amount of time elapsed since the last keyframe was added to the 3D map 190 exceeded the threshold T2, then the method 500 proceeds to step 530. Otherwise, the method 500 proceeds to step 550 to determine the maximum connected area of unmapped region.

In one arrangement, the threshold $T_2$ is set to 0.67 seconds. In an alternative arrangement, the threshold $T_2$ may be the minimum number of images processed after the last keyframe is added to the 3D map 190.

Following step 520, the method 500 proceeds to decision step 530. At step 530, tracker software module 1022, under execution of the processor 205, determines whether the minimum distance between the current location of the camera 120 and the location of the camera corresponding to a nearest keyframe exceeds a predefined threshold $T_3$. The minimum distance may be a function of scene depth. In one arrangement, threshold $T_3$ is set to one-tenth of the scene depth.

If the minimum distance between the current location of the camera 120 and the location of the camera 120 corresponding to a nearest keyframe exceeds the predefined threshold $T_3$, then the method 500 proceeds to step 540 to add the current frame as a keyframe. Otherwise, the method 500 proceeds to determining step 550.

At step 550, the tracker software module 1022, under execution of the processor 205, determines the maximum connected area of an unmapped region (R) in the current frame. The method 500 connects sub-image regions of the current frame that are determined to be unmapped based on the histogram created at step 440 with adjacent unmapped sub-image regions. The area of the unmapped region with the maximum number of connected sub-image regions may be determined.

Figure 10:
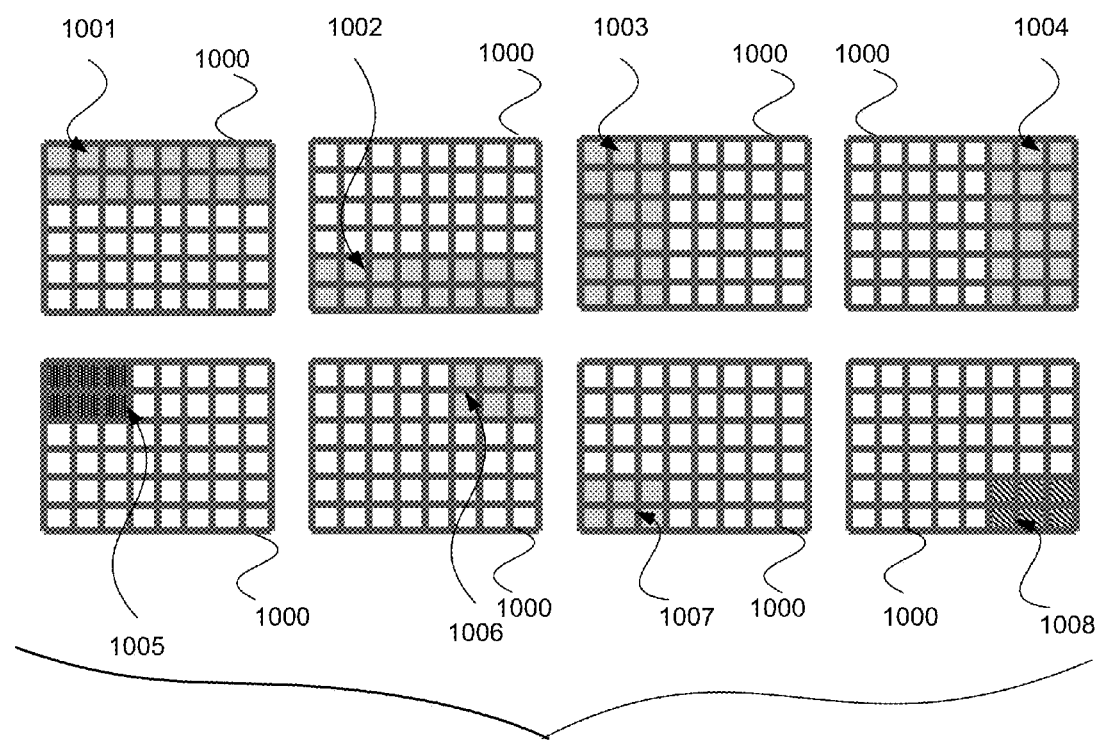
FIG. 10 is a diagram showing a set of pre-defined primitive unmapped regions.

In one arrangement, the unmapped regions may have predefined shapes and sizes. For example, FIG. 10 shows eight (8) primitive image regions 1001, 1002, 1003, 1004, 1005, 1006, 1007 and 1008 for an 8-by-6 grid 1000. In the example of FIG. 10, a primitive region is considered to be unmapped if all cells within the region are determined to be unmapped at step 440. The size of a predefined region may be used to determine an unmapped region. The number of image features in such a predefined region may also be used to determine the unmapped region.

Adjacent primitive unmapped regions may be connected together to form a larger unmapped region. The maximum connected area determined at step 550 may be stored in the memory 206.

Once the maximum connected area of the unmapped region in the current frame is determined, the method 500 proceeds to decision step 560. At step 560, if the maximum connected area of the unmapped region determined at step 550 occupies a significant portion of the current frame, the method 500 proceeds to step adding 570. Otherwise, the method 500 concludes and the current frame is discarded.

At step 570, the tracker software module 1022, under execution of the processor 205, adds the current frame as a candidate keyframe to the candidate keyframe list configured within the memory 206. The current frame is also prioritised among all candidate keyframes in the list. The method 500 gives higher priority to the current frame if the current frame has the largest maximum unconnected area of the unmapped region compared to all other candidate keyframes in the list.

In one arrangement, the maximum connected area of an unmapped region has to be larger than a predetermined size threshold at step 560 to be added to the list of candidate keyframes. The method 500 may be configured for determining if the size of the unmapped region is larger than the predetermined size threshold. For example, the size threshold may be set to 15% of the size of the current frame. In an alternative arrangement, the size threshold is based on the shape and the locality of the unmapped region in the image. For example, as shown in FIG. 10, the size threshold for the unmapped regions at the corner of the grid 1000, where the grid 1000 may represent a frame, is smaller than that of those unmapped regions along the side of the grid 1000. The size threshold for the unmapped region along the top or bottom image boundary of the grid 1000 may also be different from that for the region along the left or right boundary.

The mapper software module 1024 maintains and refines the 3D map 190. A method 600 of maintaining and refining the 3D map 190, will now be described in detail with reference to FIG. 6. The method 600 may be executed by one or more of the software code modules forming the mapper software module 1024, which are resident in the hard disk drive 210 and are controlled in their execution by the processor 205.

The method 600 begins at a decision step 610, where the mapper software module 1024, under execution of the processor 205, determines whether there are any candidate keyframes waiting to be added to the 3D map 190. If the candidate keyframe list is empty, then the method 600 proceeds to step 650. Otherwise, the method 600 proceeds to selecting step 620 to add a candidate keyframe to the 3D map 190.

At selecting step 620, the mapper software module 1024, under execution of the processor 205, selects the candidate keyframe with the largest maximum connected area of unmapped region identified at step 550 as a new keyframe and discards all other candidate keyframes in the list.

Figure 9:
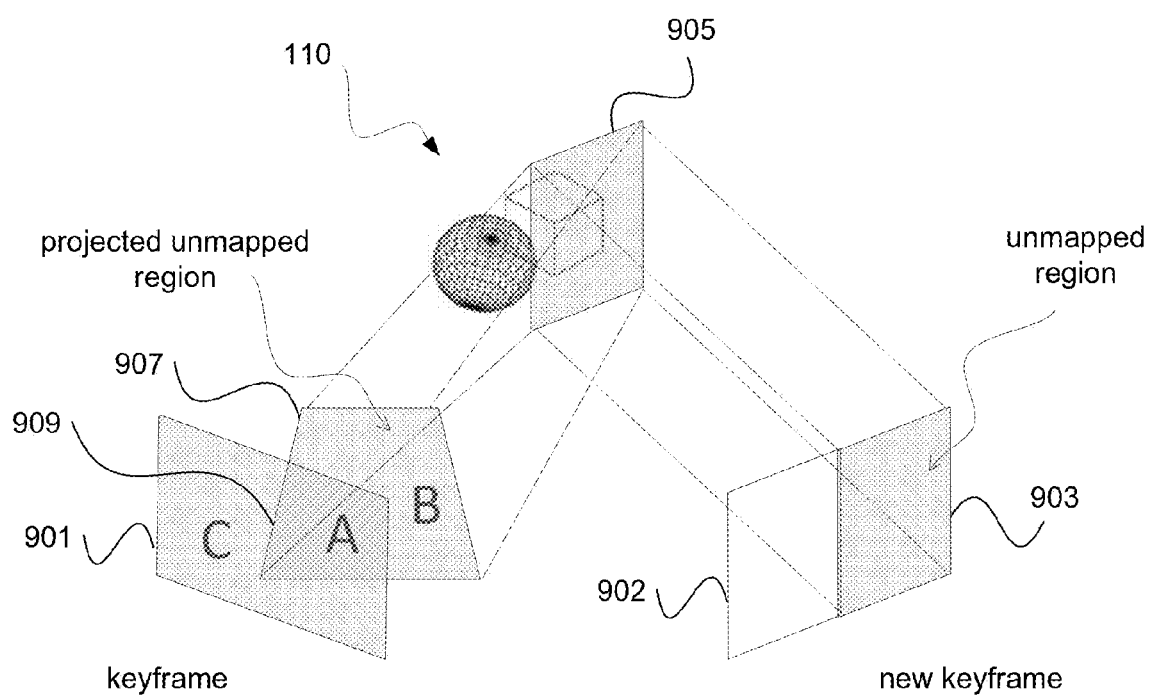
FIG. 9 is a diagram illustrating overlap between re-projected unmapped regions determined in a new keyframe and an existing keyframe as used in the method of FIG. 7.

Following step 620, the method 600 proceeds to selecting step 630. At step 630, the mapper software module 1024, under execution of the processor 205, selects an existing keyframe to pair with the new keyframe selected at step 620 for triangulation. For example, FIG. 9 shows an existing keyframe 901 and a new keyframe 902 representing two views of a scene 110. The existing keyframe 901 is represented by the sum of the regions A and C (i.e., A+C). The new keyframe 902 consists of an unmapped region 903 determined at step 550 by the tracker software module 1022. For the purpose of the example of FIG. 9, the unmapped region 903 is represented by a rectangle and may have different shapes and sizes. A portion of this unmapped region 903 is potentially visible in the existing keyframe 901 and is estimated by back-projecting (or "projecting") the unmapped region 903 in the new keyframe 902 to the scene 110 based on the position and orientation of the moving camera 120 at the viewpoint associated with the new keyframe 902 and the estimated depth of the scene 100. The back-projection of the unmapped region 903 forms a virtual 3D planar surface 905 in the scene. The virtual 3D planar surface 905 is then projected to the existing keyframe 901 based on the previously determined position and orientation of the moving camera 120 (e.g., at steps 350 or 450) associated to the existing keyframe 901. The projection of the virtual 3D planar surface 905 defines the projected unmapped region 907 at the viewpoint associated with the existing keyframe 901. The projected unmapped region 907 is represented by the sum of the regions A and B (i.e., A+B). However, the existing keyframe 901 captured only a portion 909 of this projected unmapped region 907 represented by the region A. Region B is not part of the existing keyframe 901.

The method 600 is configured for then determining the ratio between the portion of the projected unmapped region that falls within the existing keyframe (i.e., A) and the entire area of the projected unmapped region (i.e., A+B) is computed (i.e., A/A+B). The keyframe that has the largest overlap corresponding to the maximum connected area of unmapped region identified at step 550 is then selected. Accordingly, the keyframe is selected based on at least one of the size and the ratio. A method 700 of selecting a keyframe to pair with the new keyframe, as executed at step 630, will be described in further detail below with reference to FIG. 7.

The method 600 then continues from step 630 to creating step 640, where the mapper software module 1024, under execution of the processor 205, creates new map points using triangulation. In one arrangement, the tracker software module 1022 has already identified a set of image features in the new keyframe determined at step 410. Non-maximal suppression and thresholding based on a Shi-Tomasi score may be used to identify the most salient image features. The method 600 then discards salient image features near successful observations of the existing map points determined at step 440 of FIG. 4. For each remaining salient image feature, the matching image feature in the selected keyframe is determined by performing an epipolar search. Determined image features in the selected keyframe a short distance away from an epipolar line are compared with the salient image feature using ZSSD. If a match is found, the new point is triangulated and inserted into the map 190. The comparison of the image features in the selected keyframe repeats until all matching correspondences are added to the 3D point cloud 192 and the method 600 returns to step 610.

Returning to step 610, if the candidate keyframe list is empty, the method 600 proceeds to decision step 650. At step 650, if the bundle adjustment has already converged, then the method 600 proceeds to expanding step 670. Otherwise, if the bundle adjustment has not yet converged, then the method 600 proceeds to adjusting step 660 to perform further bundle adjustment.

At step 660, the coordinates of the 3D map points and the poses of all keyframes are refined by bundle adjustment. In one arrangement, global bundle adjustment is performed in the method 600 with the entire set of keyframes and 3D map points.

In another arrangement, a local bundle adjustment is firstly performed with the new keyframe and its four nearest neighbours. The local bundle adjustment is then followed by a global bundle adjustment with the entire set of keyframes and 3D map points. The method 600 returns to step 610 when bundle adjustment converges or the maximum number of iterations is reached.

Returning to step 650, if bundle adjustment has converged, then the method 600 proceeds to step 670. At step 670, the mapper software module 1024, under execution of the processor 205, improves the 3D map 190 by making new measurements in old keyframes. In one arrangement, for each recently added 3D map point, the method 600 iterates through all other keyframes to perform epipolar search to find a matching image feature in an older keyframe. If a match is found in an older keyframe, the method 600 adds the new observation to the map. In an alternative arrangement, observations and map points that are consistently classified as outliers may be removed by bundle adjustment. In yet another arrangement, at step 670, one 3D map point may be processed at a time, when epipolar search is performed for all keyframes. Following step 670, the method 600 returns to step 610 to check for any new candidate keyframes and resumes to step 670 if the candidate keyframe list is empty and bundle adjustment has converged.

In another arrangement, the mapper software module 1024 can be interrupted when a new candidate keyframe is added to the candidate keyframe list. In such an embodiment, the mapper software module 1024 returns to step 610 such that new map points can be added to the map 190 as soon as possible.

Figure 6:
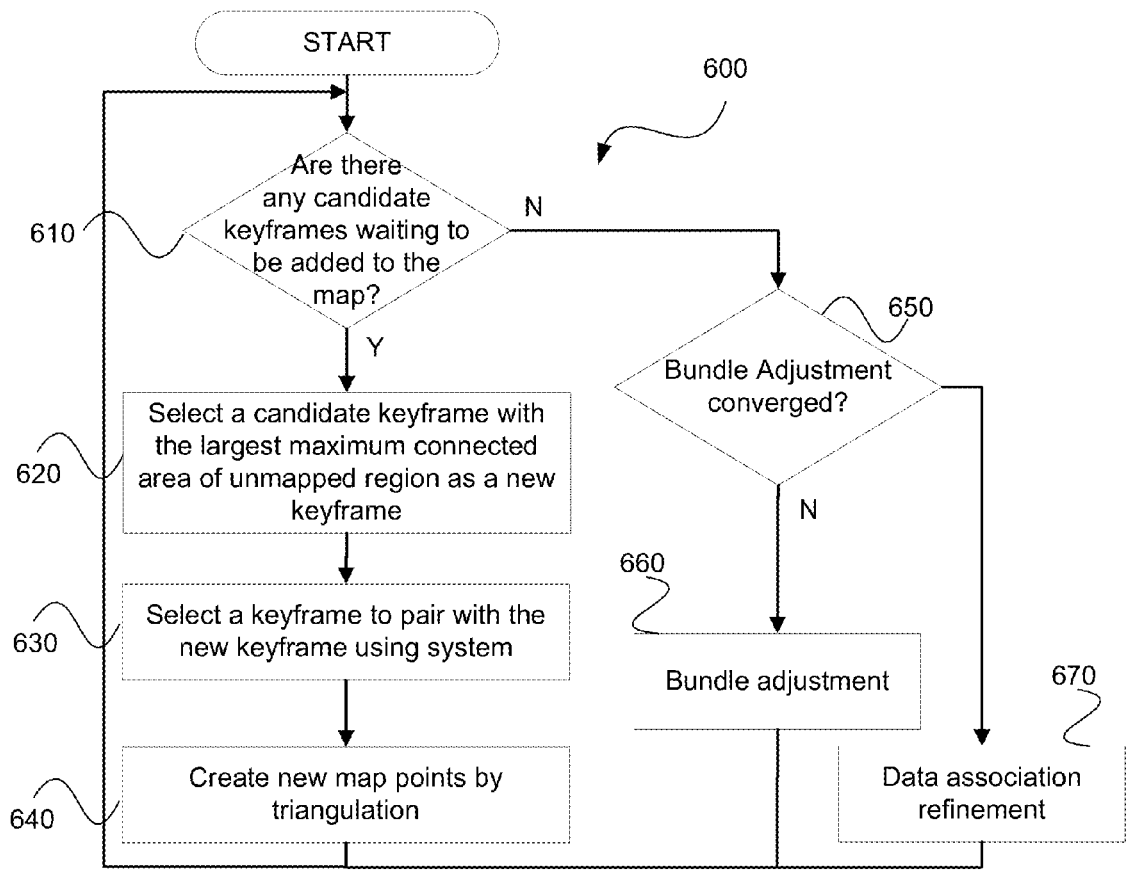
FIG. 6 is a schematic flow diagram showing a method of maintaining and refining a 3D map.
Figure 7:
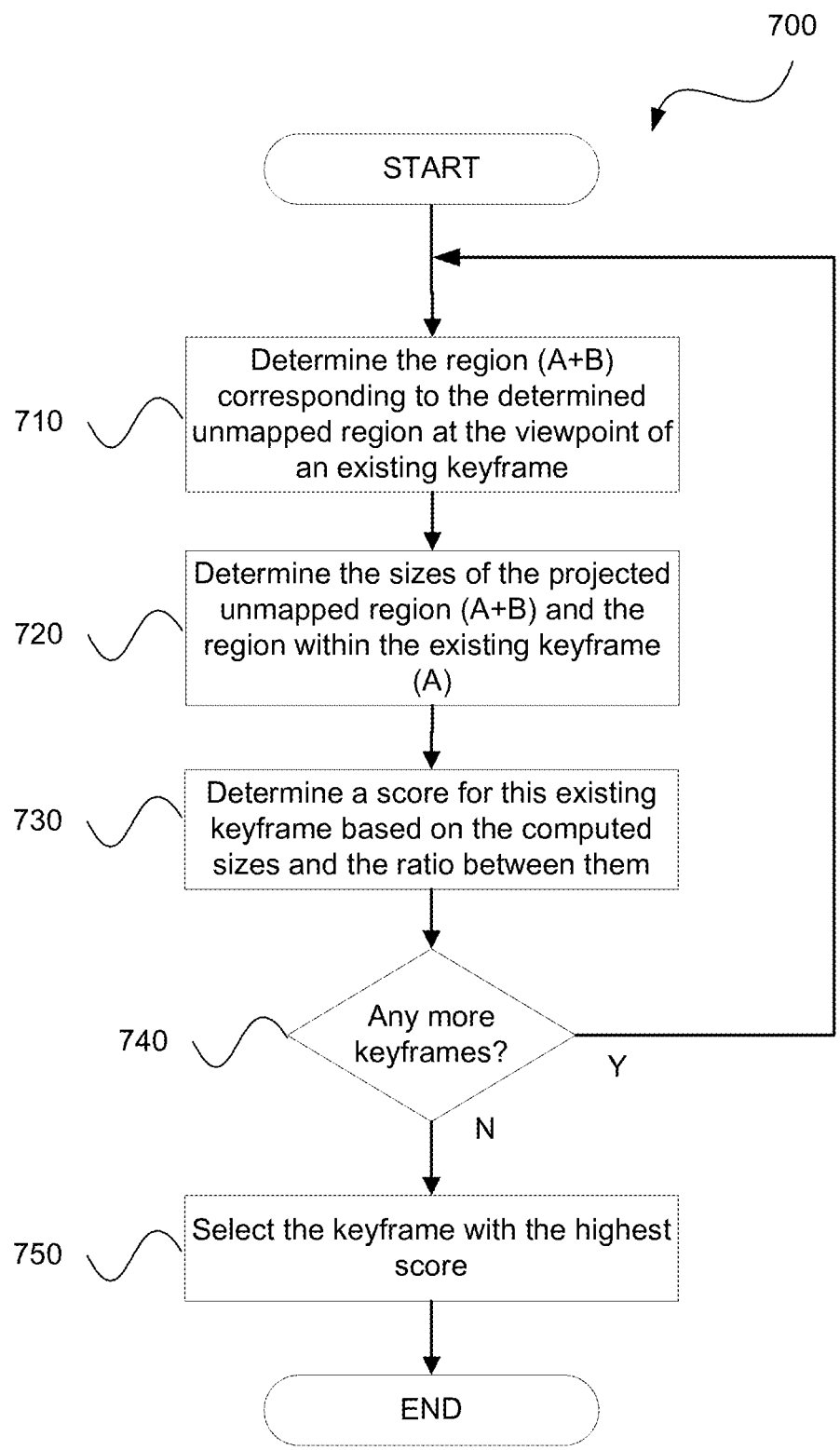
FIG. 7 is a schematic flow diagram showing a method of selecting an existing keyframe to pair with a new keyframe.

To allow the 3D map 190 to expand more rapidly, at step 630, the mapper software module 1024 selects an existing keyframe that has the largest overlap corresponding to the maximum connected area of an unmapped region in the new keyframe selected at step 620 of FIG. 6. The method 700 of selecting a keyframe to pair with the new keyframe as executed at step 630, to maximise the overlap area in the unmapped region, will now be described with reference to FIGS. 7, 8 and 9. The method 700 may be executed by one or more of the software code modules forming the mapper software module 1024, which are resident in the hard disk drive 210 and are controlled in their execution by the processor 205.

The method 700 begins at determining step 710, where the mapper software module 1024, under execution of the processor 205, determines the image region corresponding to the unmapped region 903 determined at step 550 in the new keyframe 902 selected at step 620. The image region is determined at the viewpoint of an existing keyframe 901. The existing keyframe 901 may be referred to as a "previous" frame with respect to the new keyframe 902. In one arrangement, the image region is determined at step 710 by back-projecting the four corners of the unmapped region identified in the new keyframe 902 to the scene 110 based on the determined position and orientation of the moving camera 120 at the viewpoint of the new keyframe 902 and the estimated depth of the scene 110. Back-projecting the four corners of the unmapped region 903 defines a virtual 3D planar surface 905 in the scene 110. The virtual 3D planar surface 905 is then projected at the viewpoint of the existing keyframe 901. As such, the unmapped region 903 is projected at a viewpoint associated with a previous frame. The regions A and B in FIG. 9 represent the corresponding unmapped region 903 determined in the new keyframe 902 at step 550 at the viewpoint of the existing keyframe 901.

At the next determining step 720, the mapper software module 1024, under execution of the processor 205, determines the sizes of the projected unmapped region (i.e., A+B in FIG. 9) and the region within the existing keyframe (i.e., A). The sizes of the projected unmapped region (i.e., A+B in FIG. 9) and the region within the existing keyframe (i.e., A) may be determined using "The Surveyor's Area Formula".

Following step 720, the method 700 proceeds to determining step 730, where a score is determined for the existing keyframe 901. A set of soft-value logics may be used to determine a score for the keyframe such that, by selecting a keyframe with the highest score, the number of map points expected to be added to the map 190 in the unmapped region 903 is maximised.

Figure 8A:
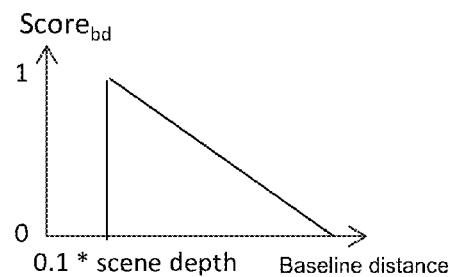
FIGS. 8A, 8B, 8C, 8D and 8E, show a set of soft-value logics used in the method of FIG. 7.

With reference to FIGS. 8A, 8B, 8C, 8D, 8E, and 9, the score for a keyframe to be paired with the new keyframe is determined in accordance with Equation (3), below:

$$\text{score} = \alpha \text{Score}_{bd} + \beta \text{Score}_{vd} + \gamma \text{Score}_{ork} + \delta \text{Score}_{orf} + \rho \text{Score}_d \quad (3)$$

where:

(i) $\text{Score}_{bd}$ is a measure of the baseline distance between the locations of an existing keyframe 901 and the new keyframe 902. As seen in FIG. 8A, the value of the $\text{Score}_{bd}$ peaks at one-tenth of the estimated scene depth (i.e., depth of the scene 110) which may be determined from the distances of all found map points to the camera location of the new keyframe 902. The value of the $\text{Score}_{bd}$ gradually reduces to zero as the baseline distance increases. $\text{Score}_{bd}$ is also zero for a distance smaller than one-tenth of the estimated scene depth since the baseline distance is too small for triangulation.

Figure 8B:
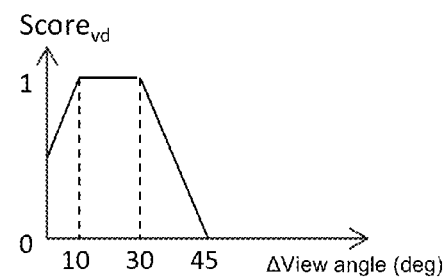

(ii) $\text{Score}_d$ is a measure of the difference in the viewing directions of an existing keyframe 901 and the new keyframe 902. As seen in FIG. 8B, the value of the $\text{Score}_d$ equals one (1) if the difference in viewing directions is between ten (10) and thirty (30) degrees. $\text{Score}_d$ decreases as the angle decreases from ten (10) degrees to zero (0) and from thirty (30) degrees to forty-five (45) degrees. $\text{Score}_d$ becomes zero for angles larger than or equal to forty-five (45) degrees. For angles larger than or equal to forty-five (45) degrees, the viewpoint difference is considered to be too large, in which case patch matching and epipolar searching are ineffective.

Figure 8C:
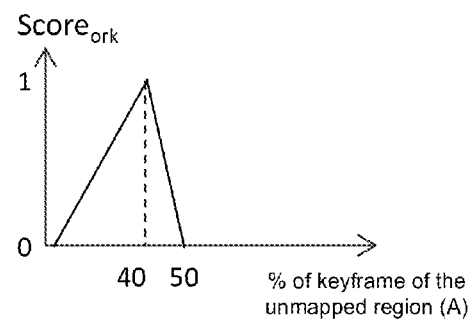
Figure 8D:
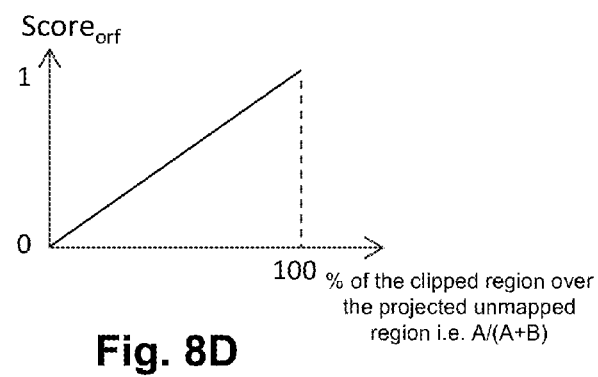
Figure 8E:
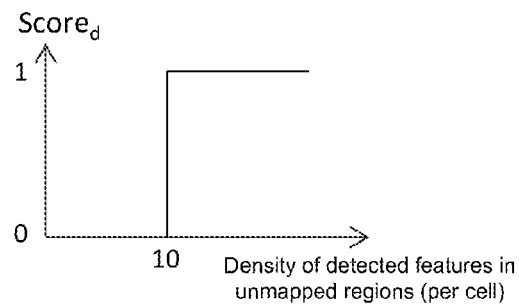

(iii) With reference to FIG. 8E, $\text{Score}_d$ is a measure of the density of the detected image features in unmapped regions 903. $\text{Score}_d$ is used to avoid selecting an existing keyframe 901, where the existing keyframe 901 has flat colour regions in the unmapped areas.

(iv) With reference to FIG. 8C, $\text{Score}_{ork}$ is a measure of the size of the unmapped region within the existing keyframe (i.e., A). In one arrangement, the value of $\text{Score}_{ork}$ is approximated by back-projecting the maximum connected area of unmapped region 903 determined at step 550 of FIG. 5 to the scene 110 based on the estimated depth of the scene 110. The virtual 3D planar surface 905 representing the back-projection of the unmapped region 903 is then projected to the viewpoint of the existing keyframe 901.

As shown in the example of FIG. 9, the projected unmapped region 907 is only partially overlapped with the existing keyframe 901, denoted by "A". In FIG. 9, "B" represents the portion of the unmapped region that is outside the existing keyframe 901. In one arrangement, $\text{Score}_{ork}$ is related to the percentage of the existing keyframe 901 of the unmapped region A. $\text{Score}_{ork}$ increases from zero (0) to one (1) as the percentage of the existing keyframe 901 of the unmapped region A increases from 0 to 40%. $\text{Score}_{ork}$ then reduces down to zero (0) as the percentage of the existing keyframe 901 of the unmapped region A reaches 50%, because a percentage of 50% implies that the pose estimated for the existing keyframe 901 might be inaccurate. The pose estimated for the existing keyframe 901 might be inaccurate for a percentage of 50% as the found map points are localised in a relatively small image region of the existing keyframe 901.

(v) $\text{Score}_{orf}$ is related to the ratio between the portion of the projected unmapped region that falls within the existing keyframe (i.e., A) and the entire area of the projected unmapped region (i.e., A+B). As seem in FIG. 8D, $\text{Score}_{orf}$ is maximised when the entire projected unmapped region is included in the existing keyframe 901. $\text{Score}_{ork}$ and $\text{Score}_{orf}$ together encourage the two keyframes to have similar scene depth and to view similar area of the unmapped region in the scene 110. The parameters, $\alpha$, $\beta$, $\gamma$, $\delta$, and $\rho$ can be obtained heuristically. In one arrangement, $\alpha$, $\beta$, $\gamma$, $\delta$, and $\rho$ are set to 0.1, 0.15, 0.15, 0.5, and 0.1 respectively.

The method 700 continues at the next decision step 740, where the mapper software module 1024, under execution of the processor 205, determines whether there are any more keyframes in the map 190 that can be paired with the new keyframe. If there are more keyframes to be processed, the method 700 returns to step 710 to compute a score for a remaining keyframe. If the method 700 has computed a score for all existing keyframes, the processing proceeds to selecting step 750 to select an image as a keyframe to pair with the new keyframe among all these existing keyframes.

Once the scores are determined for all existing keyframes, the method 700 then proceeds to step 750, where the mapper software module 1024, under execution of the processor 205, selects the existing keyframe with the highest score to pair with the new keyframe.

INDUSTRIAL APPLICABILITY

A number of methods, apparatus, and computer program products for processing multi-view digital images. Each comprising a plurality of pixels have been described above.

The described arrangements are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive. In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A non-transitory computer-readable medium storing instructions that, when executed by a processor, implement a method of selecting a pair of keyframes from a plurality of video frames captured by a camera, said method comprising: determining features of a candidate frame to which predetermined map points in a three dimensional space are projected; creating a histogram of the determined features for a plurality of regions in the candidate frame; determining one of the regions as being an unmapped region based on the created histogram; selecting the candidate frame as a new keyframe based on a size of the unmapped region; and selecting a previous keyframe to pair with the new keyframe based on a density of features in the unmapped region and a determined size between the previous keyframe and the new keyframe to produce a 3D map of point features.

2. The computer-readable medium according to claim 1, wherein the method further comprises prioritising the candidate frame based on the size of the unmapped region.

3. The computer-readable medium according to claim 1, wherein the method further comprises:
projecting the unmapped region at a viewpoint associated with the previous keyframe;
determining a size of the projected unmapped region within the previous keyframe; and
determining a ratio of the determined size to the projected unmapped region, wherein the previous keyframe is selected based on at least one of the determined size and the determined ratio.

4. The computer-readable medium according to claim 1, wherein the method further comprises projecting the unmapped region at a viewpoint associated with the previous keyframe, and wherein the projection of the unmapped region is based on position and orientation of the camera at the viewpoint.

5. The computer-readable medium according to claim 1, wherein the method further comprises determining if a number of features in a sub-image region of the new keyframe is less than a predetermined threshold.

6. The computer-readable medium according to claim 1, wherein the method further comprises determining if the size of an unmapped region is larger than a predetermined threshold.

7. The computer-readable medium according to claim 1, wherein a size of a predefined region is used to determine the unmapped region.

8. The computer-readable medium according to claim 1, wherein a number of features in a predefined region is used to determine the unmapped region.

9. An apparatus for selecting a pair of keyframes from a plurality of video frames captured by a camera, said apparatus comprising: means for determining features of a candidate frame to which predetermined map points in a three dimensional space are projected; means for creating a histogram of the determined features for a plurality of regions in the candidate frame; means for determining one of the regions as being an unmapped region based on the created histogram; means for selecting the candidate frame as a new keyframe based on a density of features in the unmapped region and a size of the unmapped region; and means for selecting a previous keyframe to pair with the new keyframe based on a determined size between the previous keyframe and the new keyframe to produce a 3D map of point features.

10. A system for selecting a pair of keyframes from a plurality of video frames captured by a camera; said system comprising: a memory for storing data and a computer program; a processor coupled to the memory for executing the computer program, the computer program comprising instructions for: determining features of a candidate frame to which predetermined map points in a three dimensional space are projected; creating a histogram of the determined features for a plurality of regions in the candidate frame; determining one of the regions as being an unmapped region based on the created histogram; selecting the candidate frame as a new keyframe based on a size of the unmapped region; and selecting a previous keyframe to pair with the new keyframe based on a density of features in the unmapped region and a determined size between the previous keyframe and the new keyframe to produce a 3D map of point features.

11. A non-transitory computer readable medium having a computer program stored thereon for selecting a pair of keyframes from a plurality of video frames captured by a camera, said processor comprising: code for determining features of a candidate frame to which predetermined map points in a three dimensional space are projected; code for creating a histogram of the determined features for a plurality of regions in the candidate frame; code for determining one of the regions as being an unmapped region based on the created histogram; code for selecting the candidate frame as a new keyframe based on a size of the unmapped region; and code for selecting a previous keyframe to pair with the new keyframe based on a density of features in the unmapped region and a determined size between the previous keyframe and the new keyframe to produce a 3D map of point features.

12. An information processing apparatus for selecting a pair of keyframes captured by a camera to be used for tracking the camera, said apparatus comprising: an acquiring unit configured to acquire a frame captured by the camera; a determination unit configured to determine, based on a projection result obtained by projection of map points in a three dimensional space to the frame, a number of features corresponding to the map points that are less than a threshold in a partial region of the frame, the partial region being an unmapped region; a selection unit configured to select the frame as a new keyframe, based on a size of the determined unmapped region; and a selection unit configured to select a previous keyframe to pair with the new keyframe, based on a density of features in the unmapped region and a determined size between the previous keyframe and the new keyframe to produce a 3D map of point features.

13. The information processing apparatus according to claim 12, further comprising a projection unit configured to project the map points in the three dimensional space to the frame.

14. The information processing apparatus according to claim 12, wherein the selection unit comprises
a determination unit configured to determine, separately for each partial region in the frame, features corresponding to projected map points in the three dimensional space,
a generation unit configured to generate a histogram of the determined features for partial regions in the frame, and
a determining unit configured to determine, based on the generated histogram, a partial region among the partial regions in the frame as an unmapped region.

15. The information processing apparatus according to claim 12, further comprising a deciding unit configured to decide whether the number of features in the partial region in the frame selected as the new keyframe is less than a predetermined threshold.

16. The information processing apparatus according to claim 12, wherein the selection unit determines, in a case where density of the features in the partial region is less than a predetermined threshold, the partial region as an unmapped region.

17. The information processing apparatus according to claim 12, further comprising a deciding unit configured to decide whether the size of the determined unmapped region is more than a predetermined threshold.

18. A method of selecting a pair of keyframes captured by a camera to be used for tracking the camera, said method comprising: acquiring a frame captured by the camera, and determining, based on a projection result obtained by projection of map points in a three dimensional space to the frame, a number of features corresponding to the map points that are less than a threshold in a partial region of the frame, the partial region being an unmapped region; selecting the frame as the new keyframe, based on a size of the determined unmapped region; and selecting a previous keyframe to pair with the new keyframe based on a density of features in the unmapped region and a determined size between the previous keyframe and the new keyframe to produce a 3D map of point features.

19. A non-transitory computer readable medium storing a program that causes a computer to function as each units of an information processing apparatus for selecting a pair of keyframes captured by a camera to be used for tracking the camera, said apparatus comprising: an acquiring unit configured to acquire a frame captured by the camera; a determination unit configured to determine, based on a projection result obtained by projection of map points in a three dimensional space to the frame, a number of features corresponding to the map points that are less than a threshold in a partial region of the frame, the partial region being an unmapped region; a selection unit configured to select the frame as a new keyframe, based on a size of the determined unmapped region; and a selection unit configured to select a previous keyframe to pair with the new keyframe based on a density of features in the unmapped region and a determined size between the previous keyframe and the new keyframe to produce a 3D map of point features.

* * * * *